(12) United States Patent
Haber et al.

(10) Patent No.: US 6,966,055 B2
(45) Date of Patent: Nov. 15, 2005

(54) OPTIMIZING POST-LINK CODE

(75) Inventors: Gad Haber, Haifa (IL); Moshe Klausner, Haifa (IL); Vadim Eisenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/798,879

(22) Filed: Mar. 2, 2001

(65) Prior Publication Data

US 2004/0205739 A1 Oct. 14, 2004

(51) Int. Cl.[7] .................................................. G06F 9/45
(52) U.S. Cl. ........................ 717/151; 717/157; 717/159
(58) Field of Search ................................. 717/137, 140, 717/141, 146, 151, 152, 154

(56) References Cited

U.S. PATENT DOCUMENTS

| | | | | |
|---|---|---|---|---|
| 5,828,886 A | * | 10/1998 | Hayashi ....................... | 717/159 |
| 6,324,683 B1 | * | 11/2001 | Fuh et al. .................... | 717/124 |
| 6,349,384 B1 | * | 2/2002 | Key et al. .................... | 712/242 |
| 6,408,433 B1 | * | 6/2002 | Click et al. .................. | 717/154 |
| 6,427,231 B1 | * | 7/2002 | Burke et al. ................. | 717/116 |
| 6,539,543 B1 | * | 3/2003 | Guffens et al. .............. | 717/161 |
| 6,588,009 B1 | * | 7/2003 | Guffens et al. .............. | 717/161 |
| 6,826,748 B1 | * | 11/2004 | Hohensee et al. ........... | 717/130 |

FOREIGN PATENT DOCUMENTS

JP          11-272473          10/1999

OTHER PUBLICATIONS

Luk et al, Ispike A post link optimizer for the intel itanium architecture, IEEE, pp 1–12, Sep. 2004.*

Gupta et al, "Resources sensitive profile directed data flow analysis for code optimization", IEEE, pp 358–368, 1997.*

Ramirez et al, "Code layout optimization for transaction processing workload", IEEE, pp 155–164, 2001.*

Asokan et al, "Providing time and space efficient procedure calls for asynchronous software thread integartion", ACM CASES, pp 167–179, Sep. 2004.*

"Reliable Post–Link Optimizations Based on Partial Information" by Gadi Haber et al., Proceedings of Feedback Directed and Dynamic Optimizations Workshop 3, Monterey, CA, Dec. 2000, p. 91–100.*

"Optimized Code Restructuring of OS/2 Executables" by Jyh–Herng Chow, IBM Centre for Advanced Studies Conference Proceedings of the 1995 conference of the Centre for Advanced Studies on Collaborative research Toronto, Ontario, Canada, 1995.*

(Continued)

Primary Examiner—Anil Khatri
(74) Attorney, Agent, or Firm—Darby & Darby (57) ABSTRACT

A method for code optimization includes disassembling object code that has been compiled and linked, and identifying a function in the disassembled code, the function including store and restore instructions with respect to a register. The disassembled code is analyzed to locate a call to the function followed by an instruction to kill the register. The code is modified so as to eliminate the store instruction from the function when the function is invoked by the located call.

42 Claims, 2 Drawing Sheets

OTHER PUBLICATIONS

"Trace–Directed Program Restructuring for AIX Executables" by R.R. Heisch, IBM J. Res. Develop, 1994.*

Pratical System for Intermodule Code Optimization at Link Time by Amitabh Srivastva et al, Western Research Laboratory, Dec. 1992.*

"Feedback Based Post–Link Optimization for Large Subsystems" by Ealan A. Henis et al., IBM Research Lab in Haifa, Nov. 1999.*

"Dead Code Elimination" by Briggs et al., Oct. 1993.*

"Exploiting Dead Value Information" by Milo M. Martin et al., Proceeding of Micro–30, Dec. 1997.*

Aho, A. et al., Compilers: Principles, Techniques and Tools, Chapter 10, "Code Optimization", Reading, Mass., Addison–Wesley Publishers, 1988, pp. 585–711.

FDPR Command, Commands Reference, vol. 2, http://222.rs6000.ibm.com/idd500/usr/share/man/info/en_US/a_doc_lib/cmds/. . . fdpr.ht, pp. 1–8, 2001.

Ball, T. et al., "Efficient Path Profiling", Proceedings of MICRO–29, Dec. 2–4, 1996, Paris, France, pp. 1–12.

Henis, E. et al., "Feedback Based Post–Link Optimization for Large Subsystems", Second Workshop on Feedback Directed Optimization, pp. 13–20, Nov. 1999, Haifa, Israel.

Schmidt, W.J. et al., "Profile–directed Restructing of Operating System Code", IBM Systems Journal, vol. 37, no. 2, 1998, pp. 270–297.

Haber, G. et al., "Reliable Post–Link Optimizations Based on Partial Information", Proceedings of Feedback Directed and Dynamic Optimizations Workshop 3, Monterey, CA, Dec. 2000, pp. 91–100.

Martin, M., et al., "Exploiting Dead Value Information", Proceeding of Micro–30, Dec. 1–3, 1997, Research Triangle Park, North Carolina, 1–11.

McFarling, S. "Program Optimization for Instruction Caches", Proc. Third Intern. Conf. On Architectural Support for Programming Languages and Operating Systems, pp. 183–191, Apr. 1989.

Heisch, R.R., "Trace–directed Program Restructuring for AIX Executable", IBM J. Research Develop., vol. 38, no. 5, Sep. 1994, pp. 595–603.

Nahshon, I. et al., "FDPR—A Post–pass Object–code Optimization Tool", Proc. Poster Session of the Intern. Conference on Compiler Construction, pp. 97–104, Apr. 1996.

Pettis, K. et al., "Profile Guided Code Positioning", ACM SIGPLAN '90 Conference on Programming Language Design and Implementation, White Plains, NY., Jun. 20, 22, 1990, pp. 16–27.

Gloy, N. et al., "Procedure Placement Using Temporal Ordering Information", Proceedings of Micro–30, Dec. 1–3, 1997, Research Triangle Park, N. Carolina, pp. 1–11.

Hwu, W., "The Superblock: An Effective Technique for VLIW and Superscalar Compilation", The Journal of Supercomputing, 7(½), Boston, Kluwer Academic Publishers, May 1993, pp. 1–24.

Calder, B. et al., "Reducing Branch Costs via Branch Alignment", $6^{th}$ International, Conference on Architectural Support for Programming Languages and Operating Systems (ASPLOS–VI), San Jose, Calif., Oct. 1994, pp. 1–10.

Srivastava, A. et al., "A Practical System for Intermodule Code Optimization at Link–Time", WRL Research Report 92/6, Palo Alto, Calif., Dec. 1992, pp. 1–29.

Fisher, J. et al., "Predicting Conditional Branch Directions from Previous Runs of a Program", Proc. Of the Intern. Conf. On Architec. Support for Programming Languages and Operating Systems, Oct. 1992, pp. 85–95.

Muth, R. et al., "also: A Link–Time Optimizer for the Compaq Alpha", http://www.cs.arizona.edu/also, Nov. 1999, pp. 1–30.

Larus, J. et al., "EEL: Machine–Independent Executable Editing", SIGPLAN '95, La Jolla, Calif., 1995, pp. 291–300.

Larus, J. et al., "Rewriting Executable Files to Measure Program Behavior", Software Practice and Experience 24(2), pp. 197–218, Feb. 1994.

Cohn, R. et al., "Optimizing Alpha Executables on Windows NT with Spike", Digital Technical Journal, vol. 9, no. 4, 1997, pp. 3–20.

Romer, T. et al., "Instrumentation and Optimization of Win32/Intel Executables Using Etch", Proc. F the USENIX Windows NT Workshop, pp. 1–7, Aug. 1997.

Young, R., "Path–based Compilation", PhD. Thesis in the Division of Engineering and Applied Sciences, Harvard University, Jan. 1998, pp. 1–136.

Young, C. et al., "Better Global Scheduling Using Path Profiles", Proceedings of the $31^{st}$ Annual International Symposium on Microarchitecture (MICRO–31), pp. 115–123, Dec. 1998.

Srivastava, A. et al., "ATOM: A system for Building Customized Program Analysis Tools", SIGPLAN '94, Orlando, Florida, pp. 196–205.

* cited by examiner

FIG. 1

OPTIMIZING POST-LINK CODE

FIELD OF THE INVENTION

The present invention relates generally to optimization of computer code to achieve faster execution, and specifically to optimizing object code following compilation and linking of the code.

BACKGROUND OF THE INVENTION

Post-link code optimizers generally perform global analysis on the entire executable code, including statically-linked library code. Since the executable code will not be re-compiled or re-linked, the post-link optimizer need not preserve compiler and linker conventions. It can thus perform aggressive optimizations across compilation units, in ways that are not available to optimizing compilers.

At the same time, post-link optimizers must deal with difficulties that are not encountered in compile-time optimization. Optimizing compilers operate on input in the form of high-level language description, typically source code, whose semantics are clearly defined. By contrast, static post-link optimization tools receive as their input low-level executable instructions (object code). The post-link optimizer must first attempt to disassemble the object code in order to identify the data and instructions contained in the code. Even after disassembly, the semantics of executable code given to a post-link optimizer may be only partially known, for the following reasons:

- Code instructions and data within an executable object are intermingled, making it impossible in some cases to distinguish between the two. Typically, there are code areas that cannot be classified unequivocally by the optimizer as either data or code instructions. In the context of the present patent application, these areas are referred to as "non-classified code areas."
- Even for fully-classified code areas that are known to contain code instructions, the semantics of the program cannot always be determined. Machine instructions operate on registers, which may contain either data information or memory locations. Therefore, the optimizer may be uncertain as to whether a given instruction performs a pure data computation, or whether it calculates an address to be used later in the program to retrieve/store data or to perform a control transfer within the program code.
- Data elements and their types, such as arrays, structures or scalars, can be identified only in a high-level language, such as C, C++, Pascal, etc. In post-link code, these elements appear as arbitrary data areas, and references to them are treated as arbitrary addresses. Therefore, at the post-link level, references to data elements cannot be fully resolved.

Because of these factors, the code semantics of the program may never be fully extracted from post-link code, and some of the dependencies between the data and code elements used by the program may remain uncertain.

Haber et al. describe an approach for dealing with these difficulties in an article entitled, "Reliable Post-Link Optimizations Based on Partial Information," in *Proceedings of Feedback Directed and Dynamic Optimizations Workshop* 3 (Monterey, Calif., December, 2000), pages 91–100, which is incorporated herein by reference. First, the program to be optimized is disassembled into basic blocks, by incrementally following all control flow paths that can be resolved in the program. The basic blocks are marked as either code, data or unclassified (not fully analyzed). Code blocks are further flagged according to their control flow properties. Partially analyzed areas of the program are delimited so as to contain the unclassified blocks, while relieving the rest of the program of the limitations that these blocks impose on optimization. The partially analyzed areas are chosen so that even when they cannot be internally optimized, they can still be repositioned safely en bloc to allow reordering and optimization of the code as a whole.

Further aspects of post-link code optimization and restructuring are described by Henis et al., in "Feedback Based Post-Link Optimization for Large Subsystems," *Second Workshop on Feedback Directed Optimization* (Haifa, Israel, November, 1999), pages 13–20; and by Schmidt et al., in "Profile-Directed Restructuring of Operating System Code," *IBM Systems Journal* 37:2 (1998), pages 270–297. These publications are incorporated herein by reference.

When a function using certain registers is called during execution of a program, it is generally necessary to store (save to memory) the contents of these registers before the function starts to run, and then to restore the register contents when the function returns. For this purpose, compilers typically add appropriate store instructions to a prolog of the function in the compiled code, with corresponding restore instructions in an epilog. For certain calls to the function, however, some of these store/restore instructions may be superfluous. For example, when a register is "killed" after the function call (i.e., when the value in the register is overwritten before it is used again), there is no purpose in storing and restoring the register contents. Because memory access has become a bottleneck for modern high-speed processors, eliminating these superfluous store and restore operations can reduce program execution time substantially.

Martin et al. describe a method of compiler optimization based on eliminating storing and restoring the contents of dead registers in "Exploiting Dead Value Information," published in *Proceedings of Micro30* (Research Triangle Park, North Carolina, 1997), which is incorporated herein by reference. Dead value information, providing assertions as to future use of registers, is calculated at compile time. The authors suggest that processor instruction set architectures be extended to enable this information to be communicated to the processor. In the absence of this hardware specialization, standard RISC call conventions may still allow a subset of the dead value information to be inferred and used by the processor in eliminating some of the store and restore operations at procedure calls and returns.

SUMMARY OF THE INVENTION

Preferred embodiments of the present invention provide methods for post-link removal of superfluous store and restore instructions, in order to optimize program execution. Unlike compiler-based methods, such as the method described by Martin et al., post-link optimization enables dead registers to be identified across compilation boundaries. Thus, the methods of the present invention enable global program optimization, since they can treat the entire executable code as a unified whole, unlike compiler optimizations, which are generally limited to the scope of the compilation unit.

Furthermore, while optimizing compilers are bound by linkage conventions, the post-link optimizer can ignore these conventions in removing unnecessary store and restore instructions. The methods of the present invention can thus be used to eliminate unneeded memory operations more thoroughly than is possible when only compile-time tools are used. In addition, these methods can be used for code optimization even when the source code is unavailable for compile-time optimizations, as may be the case when legacy object code or statically-linked object code libraries are incorporated in the executable.

In preferred embodiments of the present invention, a post-link optimizer disassembles post-link object code in order to identify functions that are called in the code. It is not necessary to analyze the entire control flow graphs of the functions, as in optimization methods known in the art, but only to determine their constituent instructions. Each of the functions typically has a prolog and an epilog, containing store and restore instructions with respect to registers used by the function. These registers are referred to herein as non-volatile registers. The optimizer analyzes the disassembled code to locate calls to the function, and then examines the instructions following each function call to determine whether any of the non-volatile registers are killed after the function returns. If so, the optimizer determines that the store and restore instructions in the function prolog and epilog with respect to the killed register are not needed for this particular call to the function (and possibly not for other calls, as well). It then modifies the post-link code so as to eliminate from the function at least the unneeded store instruction, and preferably the restore instruction, as well, when the function is invoked by this call.

In some preferred embodiments of the present invention, the optimizer identifies and analyzes multiple calls to a given function in the post-link code, in order to determine which of the non-volatile registers are killed following some call to the function. It then creates an optimized version of the function, from which store/restore instructions with respect to all of the killed non-volatile registers are removed. For each call to the function that is followed by killing one of the non-volatile registers, the optimizer creates a respective wrapper code that calls the optimized version of the function, and replaces the function call with an unconditional branch to the appropriate wrapper code. The wrapper code typically includes one or more store instructions preceding the call to the optimized function, which store the contents of the registers that are not killed following the particular function call, and then corresponding restore instructions to follow the optimized function. In other words, the wrapper replaces some of the store/restore instructions that were removed from the prolog and epilog of the optimized function, but only those that are needed for each particular call to the function.

The wrapper code and optimized function are preferably appended to the end of the original post-link code. Thus, no changes are made at this stage in the body of the code except for the replacement of the original function calls with the instructions to branch to the wrapper code. As a result, the substitution of the optimized function for the original function is entirely safe, in the sense that any references that may exist in parts of the original code that could not be fully analyzed are unaffected and remain valid. Although the optimized code is typically longer than the original post-link code, additional optimization steps as are known in the art, such as code straightening, can be applied to the code thereafter.

Alternatively, if the store instructions are conveniently ordered in the prolog of a function that is analyzed as described above (or in an optimized version of the function), the post-link code may be modified so as simply to skip the unnecessary store operations, by redirecting the function calls accordingly. Other methods for modifying the code will be apparent to those skilled in the art and are considered to be within the scope of the present invention.

There is therefore provided, in accordance with a preferred embodiment of the present invention, a method for code optimization, including:

disassembling object code that has been compiled and linked;

identifying a function in the disassembled code, the function including store and restore instructions with respect to a register;

analyzing the disassembled code to locate a call to the function followed by an instruction to kill the register; and modifying the code so as to eliminate the store instruction from the function when the function is invoked by the located call.

Preferably, modifying the code includes further modifying the code to eliminate the restore instruction from the function when the function is invoked by the located call.

In a preferred embodiment, modifying the code includes redirecting the located call so as to skip the store instruction. Preferably, modifying the code includes replicating a portion of the code corresponding to the function so as to create an optimized version of the function from which the store instruction is removed, and redirecting the located call includes directing the call to an address of the optimized version of the function. Further preferably, analyzing the disassembled code includes locating multiple calls to the function, and redirecting the located call includes redirecting a plurality of the calls to the address of the optimized version of the function.

Preferably, when the function includes store and restore instructions with respect to multiple registers, and each of the plurality of redirected calls is followed by a respective instruction to kill at least one of the multiple registers, replicating the portion of the code includes removing from the optimized version of the function the store and restore instructions with respect to substantially all of the registers killed following the redirected calls. Most preferably, modifying the code includes creating a wrapper code for at least one of the plurality of redirected calls, the wrapper code including a call to the optimized version of the function, preceded by a store instruction with respect to at least one of the killed registers and followed by a restore instruction with respect to the at least one of the killed registers, and redirecting the located call includes directing the call to the wrapper code. Further preferably, directing the call to the wrapper code includes replacing the located call with an instruction to branch to the wrapper code.

Preferably, creating the wrapper code includes creating multiple, respective wrapper codes for different ones of the redirected calls, and redirecting the plurality of the calls includes redirecting the different ones of the calls to the respective wrapper codes.

Further preferably, when the disassembled code includes a fixed sequence of instructions ending with a last instruction, replicating the portion of the code includes appending the replicated code after the last instruction, without altering the fixed sequence.

In an alternative embodiment, the disassembled code includes a fixed sequence of instructions, and modifying the code includes eliminating the store instruction without altering the fixed sequence. Preferably, analyzing the disassembled code includes identifying the store instruction in a portion of the code corresponding to the function, and redirecting the located call includes redirecting the call so as to skip the identified store instruction. Most preferably, the portion of the code includes a prolog of the function, and wherein modifying the code includes arranging the portion of the code so that the identified store instruction is at a beginning of the prolog, and redirecting the call includes directing the call to a target address subsequent to the identified store instruction.

In another embodiment, eliminating the store instruction includes replacing the store instruction with a NOP instruction.

There is also provided, in accordance with a preferred embodiment of the present invention, apparatus for code optimization, including a code processor, which is arranged to disassemble object code that has been compiled and linked, to identify a function in the disassembled code, the function including store and restore instructions with respect to a register, to analyze the disassembled code to locate a call to the function followed by an instruction to kill the register, and to modify the code so as to eliminate the store instruction from the function when the function is invoked by the located call.

There is additionally provided, in accordance with a preferred embodiment of the present invention, a computer software product, including a computer-readable medium in which program instructions are stored, which instructions, when read by a computer, cause the computer to disassemble object code that has been compiled and linked, to identify a function in the disassembled code, the function including store and restore instructions with respect to a register, to analyze the disassembled code to locate a call to the function followed by an instruction to kill the register, and to modify the code so as to eliminate the store instruction from the function when the function is invoked by the located call.

The present invention will be more fully understood from the following detailed description of the preferred embodiments thereof, taken together with the drawings in which:

DETAILED DESCRIPTION OF PREFERRED EMBODIMENTS

Figure 1:
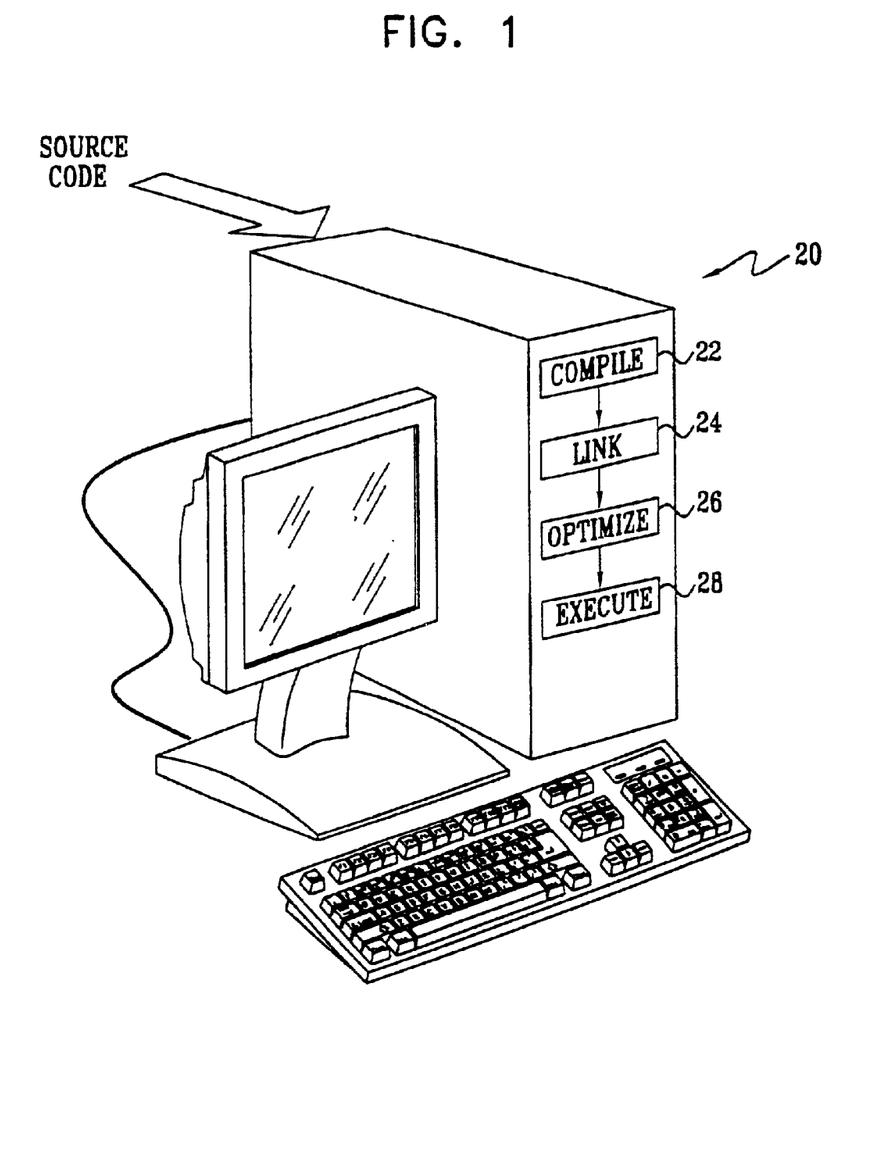
FIG. 1 is a block diagram that schematically illustrates a system for processing computer program code, in accordance with a preferred embodiment of the present invention.

FIG. 1 is a block diagram that schematically illustrates a system 20 for processing computer program code, in accordance with a preferred embodiment of the present invention. System 20 preferably comprises a general-purpose computer processor, which is programmed to carry out the functions described hereinbelow. The processor performs these functions under the control of software supplied for this purpose. The software may be downloaded to the processor in electronic form, over a network, for example, or it may alternatively be provided on tangible media, such as CD-ROM.

System 20 typically receives source code that is prepared by a programmer. A compiler 22 compiles the source code to generate object code, and a linker 24 links the compiled code with library code, as is known in the art. The linked object code is fed to an optimizer 26, which analyzes and modifies the code to eliminate redundant store/restore instructions, as described in detail hereinbelow. The optimized code can then be executed by a run-time module 28, as is likewise known in the art. Although all of functions 22 through 28 are shown for simplicity as being performed in system 20, it will be appreciated that these functions may also be separated and carried out on different computers. Thus, optimizer 26, which is the element of concern to the present invention, may receive post-link code from another source, outside system 20, and may pass the optimized code to yet another computer for execution.

Figure 2:
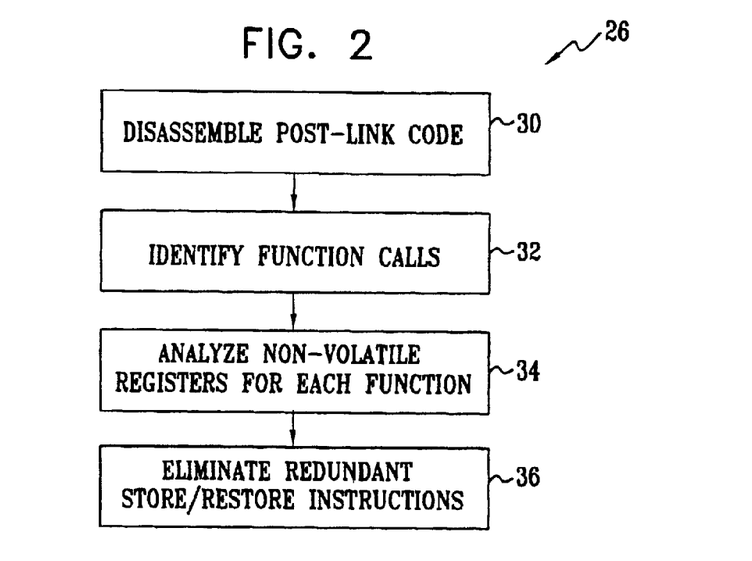
FIG. 2 is a flow chart that schematically illustrates a method for optimizing post-link code, in accordance with a preferred embodiment of the present invention.

FIG. 2 is a flow chart that schematically illustrates a method for optimizing post-link code, carried out by optimizer 26, in accordance with a preferred embodiment of the present invention. The post-link code is disassembled, at a disassembly step 30, in order to identify the instructions in the code. Any suitable method known in the art can be used for this purpose. Preferably, an incremental disassembly method is used to dissect the code into its basic blocks, as described in the above-mentioned articles by Haber et al. and by Henis et al., for example. For this purpose, addresses of instructions within the executable code are extracted from a variety of sources, in order to form a list of "potential entry points." The sources typically include program/DLL entry points, the symbol table (for functions and labels), and relocation tables (through which pointers to the code can be accessed). The optimizer traverses the program by following the control flow starting from these entry points—while resolving all possible control flow paths—and adding newly-discovered addresses of additional potential entry points to the list, such as targets of JUMP and CALL instructions.

Following the control flow of the program in this manner covers a large percentage of the code. Basic blocks that are not directly discoverable by incremental disassembly are marked as "unclassified code." These blocks typically consist of code reached via a jump by a target register that is resolved only at runtime. It is sometimes possible to classify these blocks using instrumentation of the code and dynamic runtime analysis, as described by Henis et al., but a description of this method is beyond the scope of the present patent application.

At the end of the incremental disassembly process, the entire code section of the original program is dissected into basic blocks, which are either classified or unclassified. The classified blocks are marked with flags, which characterize them as either code or data (such as branch table data), and which identify the control flow properties of the code blocks, such as Fallthrough, Continue, Call, Return, Jump, etc. The Call and Return flags, inter alia, are used to identify functions and function calls in the code, at a function identification step 32.

Typically, each of the functions identified at step 32 has a prolog and an epilog, containing instructions to store and then restore the contents of certain registers that are used by the function. In the context of the present patent application, these registers are referred to as "non-volatile registers." The treatment of the non-volatile registers in each of the functions is analyzed, at an analysis step 34, to determine which of these registers are killed following each call to the function before being referenced again at run-time. Preferably, in order to determine whether a register Rx is killed at a given address addr following a call instruction to the function in the program code, the control flow of the disassembled code following the address is traced until an instruction that kills Rx is reached. In this case Rx is considered to be killed at addr. Alternatively, if the trace reaches an instruction that uses Rx, or if the trace fails due, for example, to reaching a conditional branch instruction, a branch via a register, or an unclassified code area, then Rx cannot be considered to be killed at addr.

For each function f, the analysis of step 34 is preferably used to determine the following information:

REG(F)—the set of all non-volatile registers used in function f.

KREG(addr,f)—the sub-set of all registers in REG(f) that are killed at address addr, wherein addr is an address following a call instruction to f, as noted above.

OPT(f)—the set of non-volatile registers in the union of all KREG(addr$_1$,f), wherein addr$_1$ is an address following a call instruction to f (i.e., the set of non-volatile registers in f that are killed after one of the call instructions to f in the entire program).

When OPT(f) is not empty, there exist one or more call instructions to f in the program following which certain non-volatile registers of f are killed. Accordingly, the, program code is modified to eliminate the redundant store and restore instructions in f for the killed registers, at a code modification step 36. The modification is preferably carried out by duplicating the code of function f, without any of the redundant store/restore instructions, and then adding the necessary store and restore instructions in a "wrapper code," as described hereinbelow. Alternatively, other methods of code modification may be used to achieve the same end.

Figure 3:
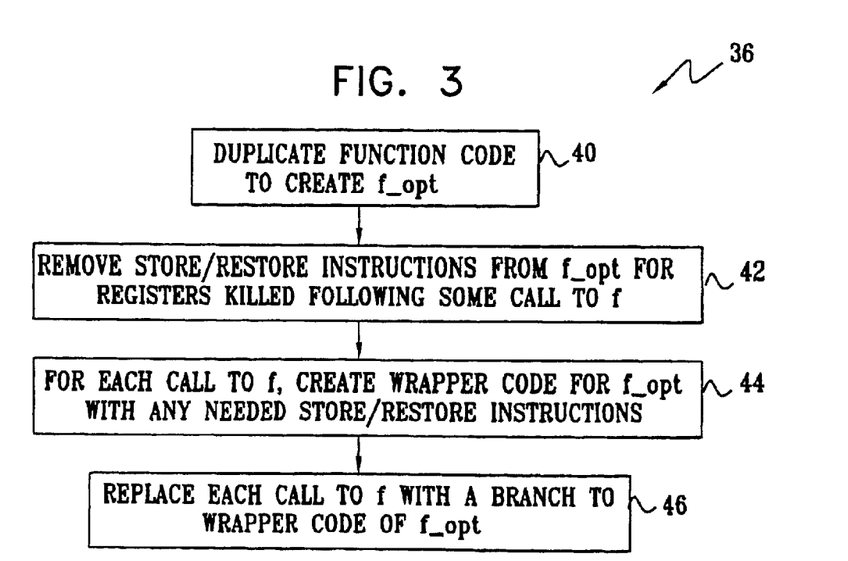
FIG. 3 is a flow chart that schematically illustrates a method for eliminating redundant store and restore instructions in post-link code, in accordance with a preferred embodiment of the present invention.

FIG. 3 is a flow chart that schematically shows details of code modification step 36, in accordance with a preferred embodiment of the present invention. The code modification is carried out for each function f in the program for which OPT(f) is not empty. First, the code of function f is duplicated, preferably at the end of the existing program code, at a duplication step 40. Let this new duplicated function be named f_opt. For each register Rx in the set OPT(f), the store instruction of Rx in the prolog of f_opt and the restore instruction of Rx in the epilog of f_opt are removed, at a removal step 42.

A wrapper code is created for each call instruction to function f in the program, at a wrapping step 44. For the purpose of this step, let addr be the code address following the call instruction to f. Assuming OPT(f)-KREG(addr,f) is not empty, the wrapper code will comprise the following instructions:

store R1
store R2
. . .
store Rn
call f_opt
restore Rn
restore Rn−1
. . .
restore R1
branch addr wherein {R1, R2, . . . Rn}=Opt(f)−KREG(addr,f). The call instruction to f in the original program is replaced with an unconditional branch to the above wrapper code, at a branching step 46. If OPT(f)−KREG(addr,f) is empty, it is sufficient to replace the call instruction to f with a call directly to f_opt. On the other hand, when KREG(addr,f) is empty, the call instruction to f in the original program is preferably left unchanged.

The reason for duplicating the code of function f at step 40 is to preserve the correctness of the program, since the program may still contain other, undetected call instructions to f. These call instructions could be made via registers or from other code modules, such as libraries or other executables whose post-link code is not given, so that the calls cannot be detected reliably by static post-link analysis. All detected call instructions that are followed by killing one of the non-volatile registers of f are redirected to call the optimized function f_opt, as described above. Call instructions that are not followed by killing any of the non-volatile registers are preferably left unchanged, as noted above. Likewise, undetected call instructions will continue to branch to the original non-optimized function f, thus maintaining the previous program semantics.

Table I below lists sample disassembled post-link code, in which several calls are made to a function foo. For the sake of this example, foo is characterized by the following definitions:

REG(foo)={R27, R28, R29}
KREG(L2,foo)={R27}, KREG(L4,foo)={ }, KREG(L6, foo)={R28}
OPT(foo)={R27, R28}

The left column in the table below shows the post-link code before optimization, while the right column shows the code after optimization by replacing two of the calls to foo with branches to appropriate wrapper code.

TABLE I

CODE COMPARISON

| Before optimization | After optimization |
|---|---|
| Program begin | Program begin |
| . . . | . . . |
| L1: call foo | L1: branch L7 |
| L2: R27 is killed here | L2: R27 is killed here |
| . . . | . . . |
| . . . | . . . |
| L3: call foo | L3: call foo |
| L4 . . . /*no non-volatile*/ | L4 . . . /*no non-volatile*/ |
| . . . /*regs of foo are*/ | . . . /*regs of foo are*/ |
| . . . /*killed here */ | . . . /*killed here */ |
| . . . | . . . |
| L5: call foo | L5: branch L8 |
| L6: R28 is killed here | L6: R28 is killed here |
| . . . | . . . |
| . . . | . . . |
| function foo: | function foo: |
|   Prolog: |   Prolog: |
|     store R27 |     store R27 |
|     store R28 |     store R28 |
|     store R29 |     store R29 |
|   Epilog: |   Epilog: |
| . . . | . . . |
|     restore R29 |     restore R29 |
|     restore R28 |     restore R28 |
|     restore R27 |     restore R27 |
|     return |     return |
| . . . | . . . |
| Program end | L7: store R28 /*wrapper*/ |
| |     /*code 1*/ |
| |   call foo_opt /*redi-*/ |
| |     /*rected call*/ |
| |   restore R28 |
| |   branch L2 |
| | L8: store R27 /*wrapper*/ |
| |     /*code 2*/ |
| |   call foo_opt /*redi-*/ |
| |     /*rected call*/ |
| |   restore R27 |
| |   branch L6 |
| | . . . |

TABLE I-continued

CODE COMPARISON

| Before optimization | After optimization |
| --- | --- |
| | function foo_opt: |
| | Prolog: |
| | store R29 |
| | /*store R27,R28*/ |
| | /*removed*/ |
| | ... |
| | Epilog: |
| | restore R29 |
| | /*restore R27,R28*/ |
| | /*removed*/ |
| | return |
| | ... |
| | Program end |

Preferably, after performing the optimization described above, a code-straightening algorithm is applied to the generated code in order to remove the unconditional branches to and from the wrapper codes. Straightening algorithms are known in the art of post-link optimization tools, such as the FDPR (Feedback Directed Program Restructuring) tool offered by IBM Corporation (Armonk, N.Y.) as part of the Performance Tool Box (PTX) for the AIX™ operating system. Further aspects of the PTX are described in the above-mentioned articles by Haber et al., Henis et al., and Schmidt et al.

The use of code duplication and wrapper codes, as described above, is a convenient, general solution, allowing redundant store/restore instructions to be eliminated even when parts of the program remain unclassified or unknown. There are cases, however, in which the entire program code is available and is fully analyzed, so that all of the function call instructions to f in the code can be reliably found. For these cases, duplication step 40 is unnecessary. Instead, the redundant store/restore instructions from the prolog and epilog of f are preferably replaced by corresponding NOP instructions. The wrapper codes created at step 44 will then contain a call to f, rather than to f_opt. Replacing the redundant store/restore instructions with NOPs instead of simply removing them eliminates the need to relocate the entire program code of f.

It may also occur that for a given function call instruction to f, the store instructions regarding the set of non-volatile registers that are killed following the function call, KREG (addr,f), are the first consecutive instructions in the prolog of the function. Alternatively, it may be that these store instructions can be rescheduled to the beginning of the prolog without affecting the program semantics. In such cases, the store instructions can be left in f_opt (or in f itself, if f is not being duplicated, as in the case described above). The redundant store instructions are then avoided simply by redirecting the target address of the given call instruction to skip the redundant stores located at the beginning of f_opt or f. This approach allows shorter and simpler wrapper codes to be used.

It may similarly occur that the store instructions regarding all of the killed non-volatile registers of f, OPT(f), are the first consecutive instructions in the prolog of the function or can be rescheduled in this way. In such cases, too, the optimization of the present invention can be performed without duplicating the code of function f. Instead, the store instructions in f are left in place at the beginning of the prolog, and the call instructions to the function are redirected to skip the store instructions as appropriate. In this case, some redundant restore instructions may still be executed.

A further alternative embodiment of the present invention can be used when it is possible to increase or create a new stack frame at post-link time. In this embodiment, all of the store and restore instructions in f with respect to the registers in OPT (f) are replaced with NOP instructions, and f is renamed f_opt. Then, all of the detected call instructions that are followed by killing one of the non-volatile registers of f are replaced by calls to appropriate wrapper codes to store and restore the unkilled registers, as described above. In order to handle any possible unresolved call instructions to f, as well as call instructions to f that are not followed by killing any of the non-volatile registers, a new function f is added to the program code, as listed below:

store R1
store R2
...
store Rn
call f_opt
restore Rn
restore Rn−1
...
restore R1
return Here again, {R1, R2, ..., Rn} is the set of non-volatile registers in OPT(f).

The relocation information of the post-link program is updated so that undetected call instructions to the original function f, along with the call instructions that are not followed by killing any of the non-volatile registers, are redirected to the new function. In this way, all non-resolved call instructions to f will automatically branch to the new f, and the original semantics of the program are maintained.

The preferred embodiments described above are all based on the assumption that for the sake of safety, the original post-link code cannot be expanded or shrunk during optimization. The principles of the present invention can also be applied, however, in an environment that enables deletion, addition and movement of code. In this environment, the need for wrapper codes can be avoided by instead inserting the required store and restore instructions directly before and after the corresponding call instructions to f. By the same token, instead of replacing store and restore instructions with NOP instructions, as described above, the unneeded instructions can simply be deleted from the code.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for code optimization, comprising:
   disassembling object code that has been compiled and linked;
   identifying multiple calls to a function in the disassembled code, the function including store and restore instructions with respect to a register;
   analyzing the disassembled code to locate one of the calls to the function followed by an instruction to kill the register, wherein at least one other call to the function is not followed by an instruction to kill the register; and
   modifying the code corresponding to the function so as to eliminate execution of the store instruction from the function when the function is invoked by the one of the calls, without eliminating the execution of the store instruction when the function is invoked by the at least one other call.

2. A method according to claim 1, wherein modifying the code comprises further modifying the code to eliminate the restore instruction from the function when the function is invoked by the one of the calls.

3. A method according to claim 1, wherein modifying the code comprises redirecting the one of the calls so as to skip the store instruction.

4. A method according to claim 3, wherein modifying the code comprises replicating a portion of the code corresponding to the function so as to create an optimized version of the function from which the store instruction is removed, and wherein redirecting the one of the calls comprises directing the one of the calls to an address of the optimized version of the function.

5. A method according to claim 4, wherein redirecting the located call comprises redirecting a plurality of the calls to the address of the optimized version of the function.

6. A method according to claim 5, wherein the function includes store and restore instructions with respect to multiple registers, and wherein each of the plurality of redirected calls is followed by a respective instruction to kill at least one of the multiple registers, and wherein replicating the portion of the code comprises removing from the optimized version of the function the store and restore instructions with respect to substantially all of the registers killed following the redirected calls.

7. A method according to claim 6, wherein modifying the code comprises creating a wrapper code for the at least one other call to the function, the wrapper code comprising a call to the optimized version of the function, preceded by a store instruction with respect to the register and followed by a restore instruction with respect to the register, and wherein modifying the code comprises directing the at least one other call to the wrapper code.

8. A method according to claim 7, wherein directing the at least one other call to the wrapper code comprises replacing the at least one other call with an instruction to branch to the wrapper code.

9. A method according to claim 7, wherein creating the wrapper code comprises creating multiple, respective wrapper codes for different ones of the redirected calls, and wherein redirecting the plurality of the calls comprises redirecting the different ones of the calls to the respective wrapper codes.

10. A method according to claim 4, wherein the disassembled code comprises a fixed sequence of instructions ending with a last instruction, and wherein replicating the portion of the code comprises appending the replicated code after the last instruction, without altering the fixed sequence.

11. A method according to claim 3, wherein the disassembled code comprises a fixed sequence of instructions, and wherein modifying the code comprises eliminating the execution of the store instruction without altering the fixed sequence.

12. A method according to claim 3, wherein analyzing the disassembled code comprises identifying the store instruction in a portion of the code corresponding to the function, and wherein redirecting the one of the calls comprises redirecting the one of the calls so as to skip the identified store instruction.

13. A method according to claim 12, wherein the portion of the code comprises a prolog of the function, and wherein modifying the code comprises arranging the portion of the code so that the identified store instruction is at a beginning of the prolog, and wherein redirecting the one of the calls comprises directing the one of the calls to a target address subsequent to the identified store instruction.

14. A method according to claim 1, wherein eliminating the execution of the store instruction comprises replacing the store instruction with a NOP instruction.

15. Apparatus for code optimization, comprising a code processor, which is arranged to disassemble object code that has been compiled and linked, to identify multiple calls to a function in the disassembled code, the function including store and restore instructions with respect to a register, to analyze the disassembled code to locate one of the calls to the function followed by an instruction to kill the register, wherein at least one other call to the function is not followed by an instruction to kill the register, and to modify the code corresponding to the function so as to eliminate execution of the store instruction from the function when the function is invoked by the one of the calls, without eliminating the execution of the store instruction when the function is invoked by the at least one other call.

16. Apparatus according to claim 15, wherein the processor is arranged to further modify the code to eliminate the restore instruction from the function when the function is invoked by the one of the calls.

17. Apparatus according to claim 15, wherein the processor is arranged to modify the code so as to redirect the one of the calls to skip the store instruction.

18. Apparatus according to claim 17, wherein the processor is arranged to modify the code by replicating a portion of the code corresponding to the function so as to create an optimized version of the function from which the store instruction is removed, wherein the one of the calls is redirected to an address of the optimized version of the function.

19. Apparatus according to claim 18, wherein a plurality of the calls are redirected to the address of the optimized version of the function.

20. Apparatus according to claim 19, wherein the function includes store and restore instructions with respect to multiple registers, and wherein each of the plurality of redirected calls is followed by a respective instruction to kill at least one of the multiple registers, and wherein the processor is arranged to remove from the optimized version of the function the store and restore instructions with respect to substantially all of the registers killed following the redirected calls.

21. Apparatus according to claim 20, wherein the processor is arranged to create a wrapper code for the at least one other call to the function, the wrapper code comprising a call to the optimized version of the function, preceded by a store instruction with respect to the register and followed by a restore instruction with respect to the register, and wherein the at least one other call is redirected to the wrapper code.

22. Apparatus according to claim 21, wherein the at least one other call is redirected to the wrapper code by replacing the at least one other call in the code with an instruction to branch to the wrapper code.

23. Apparatus according to claim 21, wherein the processor is arranged to create multiple, respective wrapper codes for different ones of the redirected calls, and to modify the code so as to redirect the different ones of the calls to the respective wrapper codes.

24. Apparatus according to claim 18, wherein the disassembled code comprises a fixed sequence of instructions ending with a last instruction, and wherein the replicated code is appended to the code after the last instruction, without altering the fixed sequence.

25. Apparatus according to claim 17, wherein the disassembled code comprises a fixed sequence of instructions, and wherein the execution of the store instruction is eliminated without altering the fixed sequence.

26. Apparatus according to claim 17, wherein the processor is arranged to identify the store instruction in a portion of the code corresponding to the function, and to modify the code so that the one of the calls is redirected to skip the identified store instruction.

27. Apparatus according to claim 26, wherein the portion of the code comprises a prolog of the function, and wherein the portion of the code is arranged so that the identified store instruction is at a beginning of the prolog, and wherein the one of the calls is redirected to a target address subsequent to the identified store instruction.

28. Apparatus according to claim 15, wherein the processor is arranged to modify the code by replacing the store instruction with a MOP instruction.

29. A computer software product, comprising a computer-readable medium in which program instructions are stored, which instructions, when read by a computer, cause the computer to disassemble object code that has been compiled and linked, to identify multiple calls to a function in the disassembled code, the function including store and restore instructions with respect to a register, to analyze the disassembled code to locate one of the calls to the function followed by an instruction to kill the register, wherein at least one other call to the function is not followed by an instruction to kill the register, and to modify the code corresponding to the function so as to eliminate execution of the store instruction from the function when the function is invoked by the call one of the calls, without eliminating the execution of the store instruction when the function is invoked by the at least one other call.

30. A product according to claim 29, wherein the instructions cause the computer to further modify the code to eliminate the restore instruction from the function when the function is invoked by the one of the calls.

31. A product according to claim 29, wherein the instructions cause the computer to modify the code so as to redirect the one of the calls to skip the store instruction.

32. A product according to claim 31, wherein the instructions cause the computer to modify the code by replicating a portion of the code corresponding to the function so as to create an optimized version of the function from which the store instruction is removed, wherein the one of the calls is redirected to an address of the optimized version of the function.

33. A product according to claim 32, wherein a plurality of the calls are redirected to the address of the optimized version of the function.

34. A product according to claim 33, wherein the function includes store and restore instructions with respect to multiple registers, and wherein each of the plurality of redirected calls is followed by a respective instruction to kill at least one of the multiple registers, and wherein the instructions cause the computer to remove from the optimized version of the function the store and restore instructions with respect to substantially all of the registers killed following the redirected calls.

35. A product according to claim 34, wherein the instructions cause the computer to create a wrapper code for the at least one other call to the function, the wrapper code comprising a call to the optimized version of the function, preceded by a store instruction with respect to the register and followed by a restore instruction with respect to the register, and wherein the at least one other call is redirected to the wrapper code.

36. A product according to claim 35, wherein the at least one other call is redirected to the wrapper code by replacing the at least one other call in the code with an instruction to branch to the wrapper code.

37. A product according to claim 35, wherein the instructions cause the computer to create multiple, respective wrapper codes for different ones of the redirected calls, and to modify the code so as to redirect the different ones of the calls to the respective wrapper codes.

38. A product according to claim 32, wherein the disassembled code comprises a fixed sequence of instructions ending with a last instruction, and wherein the replicated code is appended to the code after the last instruction, without altering the fixed sequence.

39. A product according to claim 31, wherein the disassembled code comprises a fixed sequence of instructions, and wherein the execution of the store instruction is eliminated without altering the fixed sequence.

40. A product according to claim 31, wherein the instructions cause the computer to identify the store instruction in a portion of the code corresponding to the function, and to modify the code so that the one of the calls is redirected to skip the identified store instruction.

41. A product according to claim 40, wherein the portion of the code comprises a prolog of the function, and wherein the portion of the code is arranged so that the identified store instruction is at a beginning of the prolog, and wherein the one of the calls is redirected to a target address subsequent to the identified store instruction.

42. A product according to claim 29, wherein the instructions cause the computer to modify the code by replacing the store instruction with a NOP instruction.

* * * * *